May 4, 1926.

A. M. CURRIER 1,583,667

INSERTABLE SAW TOOTH AND HOLDER THEREFOR

Filed May 22, 1924

WITNESSES

INVENTOR
Alfred M. Currier
BY
ATTORNEYS

Patented May 4, 1926.

1,583,667

UNITED STATES PATENT OFFICE.

ALFRED MAXWELL CURRIER, OF ABERDEEN, WASHINGTON.

INSERTABLE SAW TOOTH AND HOLDER THEREFOR.

Application filed May 22, 1924. Serial No. 715,157.

*To all whom it may concern:*

Be it known that I, ALFRED MAXWELL CURRIER, a citizen of the United States of America, and a resident of Aberdeen, in the county of Grays Harbor and State of Washington, have invented a new and Improved Insertable Saw Tooth and Holder Therefor, of which the following is a description:

My invention relates to insertable saw teeth and holders and has for its general object to provide novel and secure means for holding the saw teeth removably in position in a manner so that the strains and pressures will not affect the tension of the saw.

Specifically, the invention has for objects to provide a stop for the saw tooth on the holding means as distinguished from the common practice of providing a tooth stop on the blade; and to provide a tooth assemblage of such a character as to leave ample saw blade strength between the teeth assemblages.

A further object of the invention is to provide holding means with resilient holding members that yield to the forcible withdrawal of the tooth by a suitable tool.

The nature of my invention and its distinguishing features and advantages will clearly appear as the description proceeds.

Reference is to be had to the accompanying drawings forming a part of this specification, it being understood that the drawings are merely illustrative of practical examples of the invention.

Figure 1 is a fragmentary side elevation showing a portion of a saw blade provided with my improved tooth and tooth-holding means;

Figure 2 is an enlarged transverse section as indicated by the line 2—2 of Figure 1;

Figure 1:
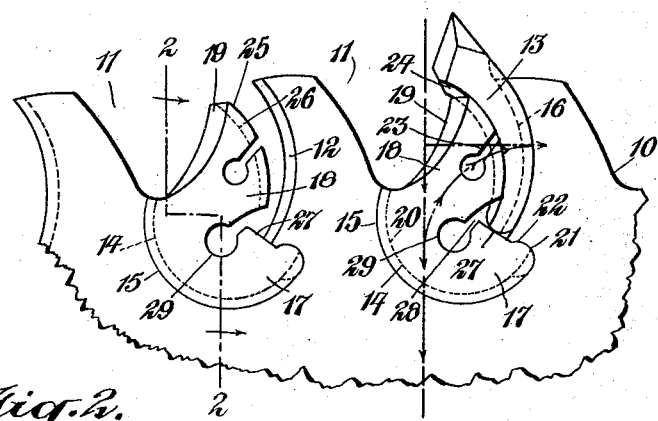
Figure 2:
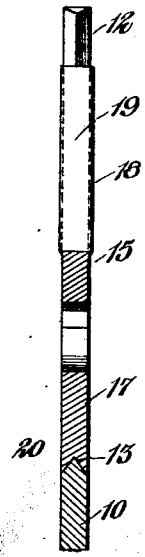

In the illustrated example of my invention the numeral 10 indicates a fragment of a saw blade; 11, the saw clearance spaces in front of the teeth; 12, a seat at the back of the tooth 13 and receiving the pressure of the tooth; and 14, a curved seat on the saw blade V-shaped in cross section for receiving the tooth holder 15. The seat 12 is also V-shaped in cross section and said seat is concaved while the back of the tooth 13 is convexed, said back of the tooth having a V-groove 16 corresponding with the cross section of edge 12.

The tooth holder 15 includes an anchoring or base portion 17 and a blocking strut portion 18 extending outwardly from said base. The front edge 19 of the strut 18 is of known form. The base portion 17 has an inner edge 20 curved to accord with the curvature of the seat 14 on the saw blade and presents a V-shaped groove corresponding with the cross section of said seat 14. At the rear end of the base 17 of the holder 15, said holder is given a formation to present a curved protuberance 21 that enters in a corresponding curved recess 22 in the saw blade at the rear end of the curved seat 14, the blade 10 at recess 22 thus forming the stop limiting the movement of the holder 15 into its position in the saw blade.

In the form of the invention shown in Figure 1 the strut portion 18 of the holder 14 is formed with a slot 23 preferably a key-hole slot to thereby divide the strut 18 into two independently acting strut sections to give duplex bearing against the V-shaped front edge 24 of the tooth 13. Said front edge 24 of the tooth and the opposed bearing edge 25 of the strut 18 are curved and said edge 25 of said struts has a V-shaped groove 26 to accord with the cross section of the V-shaped front edge 24.

In accordance with my invention I provide on the base of the holder 15 a shoulder 27 extending from the curved protuberance 21 toward the strut 18. The base portion 17 is separated from the strut portion 18 by a slot 28 complementary to a round hole or recess 29 in the holder. The shoulder 27 extends in a line transverse to the curved tooth seat 12 on the blade and extends beyond the same to lie in the path of the tooth 13 when the latter is inserted. Thus, the shoulder 27 forms the tooth stop of the saw as distinguished from providing a tooth stop on the saw blade. The hole 29 is adapted to receive an operating tool. It will be seen that the edge 12 of the saw blade and the pressure edge 25 of strut 18 of the holder 15 form an arcuate space accommodating the tooth 13.

The pressure of the strut 18 is rearwardly against the front of the tooth 13 and approximately at right angles to a diametric or radial line as indicated by the dot and dash lines in Figure 1. The resiliency of the tooth-holding members of the holder 15 serve to effectively retain the tooth in position requiring its forcible withdrawal and they readily yield to an outward arcuate pull on the tooth in removing the latter. The strain on the tooth in cutting is transmitted to the stop 27 and tends to increase the pressure of the strut 18 against the front of the tooth.

Figures 3, 5:
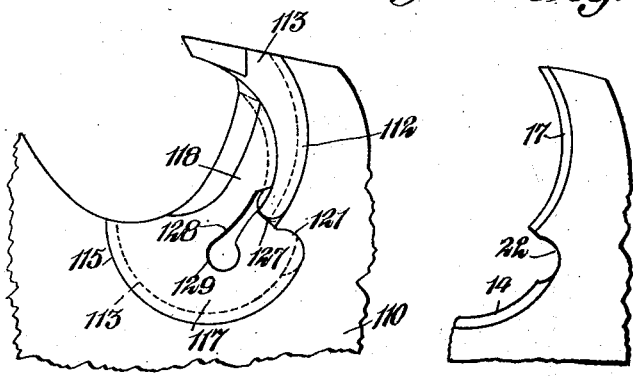
Figure 3 is a fragmentary side elevation showing a portion of the saw blade and a tooth with a different cutting portion from that shown in Figure 1, as well as a modified form of holding means.
Figure 5 is a fragmentary side elevation showing a portion of the saw blade, the tooth and holder being omitted.
Figure 4:
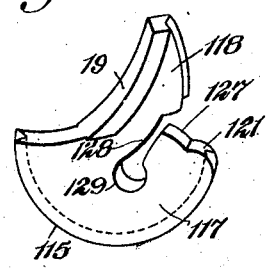
Figure 4 is a side elevation of the holding means in the form of the invention illustrated in Figure 3.

In the form of the invention shown in Figures 3 and 4, the blade 110 has a seating edge 112 for the back of the tooth corresponding generally with the seat 12 and said blade has a seat 113 corresponding generally with the seat 14 to receive the base portion 117 of the holder designated generally by the numeral 115. In Figures 3 and 4 also the holder 115 is shown with a single strut 118, the slot 23 being omitted in this instance. The form of holder shown in Figure 3 is particularly adapted for holding a chisel-pointed tooth or bit while the form shown in Figure 1 is particularly adapted for holding what is known as a cut-off tooth or bit. The strut 118 is defined at its rear edge by a slot 128 and a hole 129 corresponding generally with the slot 28 and hole 29. Also, the protuberance or heel 121 corresponds generally with the member 21 and shoulder 127 corresponds essentially with the shoulder 27 and forms a stop which is engaged by the inner end of the tooth 113.

It will be observed that the strut 18 or 118 is directed from its connection with the base or anchoring portion 17 or 117 toward the tooth in the rear of said strut. Also, it will be seen that the force of the pressure by the holding member against the tooth tends to develop rather a centripetal force than a centrifugal force.

It is to be noted that the curve of the seating edge 12 for the tooth 13 and the curved lines of the seating edge of said tooth are struck from a center materially outward of the center from which are struck the curves of the seat 14 for the tooth holder 15 and the corresponding curve of the seating edge of said tooth holder. By providing a tooth holder having a curved seating edge and having a blade with a correspondingly curved seat struck from a center materially within the center from which the curved lines at the back of the tooth are struck, two important results are obtained in that the forces developed in the operation of sawing tend to cause the tooth holder to have an increasing hold on the tooth and the stresses on the holder instead of being in a direction tending to cause the holder to work out of its seat tends in the opposite direction to constrain the holder to maintain its seat, that is to say, the force exerted on the tooth as the work is crowded against it will be transmitted in an inward direction through the blocking strut 18 of the tooth holder 15 and the force will be exerted tangentially on the tooth holder in a direction to rotate said holder counter clockwise and force said tooth holder against the wall of the curved recess 22 instead of in the opposite direction.

I would state in conclusion that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:—

1. A saw including a blade, insertable teeth seated in said blade, and separate holders for the respective teeth, said holders each comprising an anchoring portion seated in the blade, and a blocking strut exerting pressure on that tooth at the back of the strut, said holders each having a slot between the end of the anchoring portion and the adjacent side of the strut, and having a keyhole slot in the strut dividing the same into a pair of independently acting strut members.

2. A saw including a blade, insertable teeth seated in said blade and separate holders for the respective teeth, said holders each comprising an anchoring portion seated in the blade, and a blocking strut portion exerting pressure on the tooth at the back of the strut, said holders each having a slot between the end of the anchoring portion and the adjacent side of the strut portion, said end of the anchoring portion including a curved protuberance seating in a curved recess in the blade and being formed with a shoulder running from the protuberance to the slot and constituting a stop for limiting the inward movement of the teeth when inserted in the blade.

3. A saw including a blade having seats for teeth, and having recesses adjacent to the inner ends of the seats, teeth accommodated on said seats of the blade, and holders for the teeth having curved seats in the blade, the holders furthermore having stop protuberances accommodated in said recesses so that the latter limit the inward movement of the holder on to its curved seat, each holder including a blocking strut portion bearing against the front of the tooth, the curvature of the end of the strut and the portion of the tooth which seats thereon, being sharper than the curvature of the portion of the tooth which seats on the blade, so that the pressure of the tooth on the strut will be substantially tangentially of the holder, tending to move the anchoring portion of the holder in a direction to force the stop protuberance into seating position in its recess.

4. A saw including a blade formed with a seat for a saw tooth, and a seat for a saw tooth holder, said holder including an anchoring portion having a heel accommodated in a recess in the blade and including a blocking strut coacting with the blade to support the tooth, said holder also including a shoulder extending from the heel to the strut, against which the inner end of the tooth is adapted to seat, the curvature of the various seats for the holder and tooth being such that when work is crowded against the tooth, pressure will be transmitted directly to the strut and tangentially to the holder to force the heel of the holder into its recess in the blade.

ALFRED MAXWELL CURRIER.